United States Patent [19]

DeLuca et al.

[11] Patent Number: 5,086,501
[45] Date of Patent: Feb. 4, 1992

[54] COMPUTING SYSTEM WITH SELECTIVE OPERATING VOLTAGE AND BUS SPEED

[75] Inventors: Michael J. DeLuca, Boca Raton; Mario A. Rivas, West Palm Beach, both of Fla.

[73] Assignee: Motorola, Inc., Schaumburg, Ill.

[21] Appl. No.: 342,766

[22] Filed: Apr. 17, 1989

[51] Int. Cl.⁵ .................. H04Q 1/30; H04Q 7/00; H04B 7/00
[52] U.S. Cl. .................. 395/550; 364/273.1; 364/273.2; 364/270.2; 364/948.7; 364/240.3
[58] Field of Search .................. 307/24, 28, 43; 340/825.08, 825.47, 825.44

[56] References Cited

U.S. PATENT DOCUMENTS

| | | | |
|---|---|---|---|
| 4,144,463 | 3/1979 | Sigiura | 307/75 |
| 4,255,782 | 3/1981 | Joyce | 363/8 |
| 4,422,178 | 12/1983 | Mori | 455/343 |
| 4,553,225 | 11/1985 | Ohe | 365/201 |
| 4,662,736 | 5/1987 | Taniguchi et al. | 354/412 |
| 4,668,949 | 5/1987 | Akahori et al. | 340/825.47 |
| 4,734,694 | 3/1988 | Umetsu et al. | 340/825.44 |
| 4,740,883 | 4/1988 | McCollum | 364/140 |
| 4,755,816 | 7/1988 | DeLuca | 340/825.44 |
| 4,809,231 | 2/1989 | Shannon et al. | 365/201 |
| 4,825,193 | 4/1989 | Siwiak et al. | 340/311.1 |
| 4,908,523 | 3/1990 | Snowden et al. | 307/43 |
| 4,918,431 | 4/1990 | Borras | 340/825.44 |
| 4,961,073 | 10/1990 | Drapac et al. | 340/825.44 |
| 5,021,679 | 6/1991 | Fairbanks et al. | 307/66 |

Primary Examiner—Michael R. Fleming
Assistant Examiner—Robert S. Hausen
Attorney, Agent, or Firm—Thomas G. Berry; Vincent B. Ingrassia; William E. Koch

[57] ABSTRACT

A computing system has a predetermined minimum operating voltage. A method of operation thereof comprises the step of determining the predetermined minimum operating voltage of the system by operating the computing system at a plurality of different operating voltages until the computing system operates unsatisfactorily; and selecting the operating voltage of the system at a level greater than the unsatisfactory operating voltage.

11 Claims, 3 Drawing Sheets

COMPUTING SYSTEM WITH SELECTIVE OPERATING VOLTAGE AND BUS SPEED

INTRODUCTION

This invention relates to computing systems and particularly, though not exclusively, to portable microcomputer based systems such as, for example, in paging receivers.

In paging receivers, and other microcomputer based portable equipment such as two-way radios, remote control transmitters, toys, personal computers, etc., there is a continuing need to conserve battery life.

In known paging receivers, in order to provide an acceptable yield of satisfactorily functioning receivers in view of process variations which occur in fabricating the receiver components and which result in different receivers having different minimum operating voltages, a fixed operating voltage is chosen for all receivers at a level higher than the minimum operating voltage required by most of the receivers.

Clearly, in receivers which have a lower minimum operating voltage than the chosen operating voltage there is waste of energy and a consequent unnecessary shortening of battery life, but reducing the chosen operating voltage to extend the battery life of these receivers would cause other receivers with higher minimum operating voltages to function satisfactorily.

It is an object of the present invention to provide a computing system and a method of operation thereof wherein the above mentioned disadvantage may be overcome or at least alleviated.

SUMMARY OF THE INVENTION

In accordance with a first aspect of the present invention there is provided a computing system having a predetermined minimum operating voltage, comprising: voltage producing means for selectively producing a voltage output for operating the computing system, the voltage output being a member of a plurality of predetermined voltages producible by the voltage producing means; and means for selecting the voltage output of the voltage producing means which substantially corresponds to the predetermined minimum operating voltage.

In accordance with a second aspect of the present invention there is provided a method of operating a computing system having a predetermined minimum operating voltage comprising the steps of: determining the predetermined minimum operating voltage of the system; and selecting the operating voltage of the system to correspond substantially to the predetermined minimum operating voltage.

BRIEF DESCRIPTION OF THE DRAWINGS

One paging receiver and its method of operation in accordance with the invention will now be described, by way of example only, with reference to the accompanying drawings, in which.

DESCRIPTION OF PREFERRED EMBODIMENT

Figure 1:
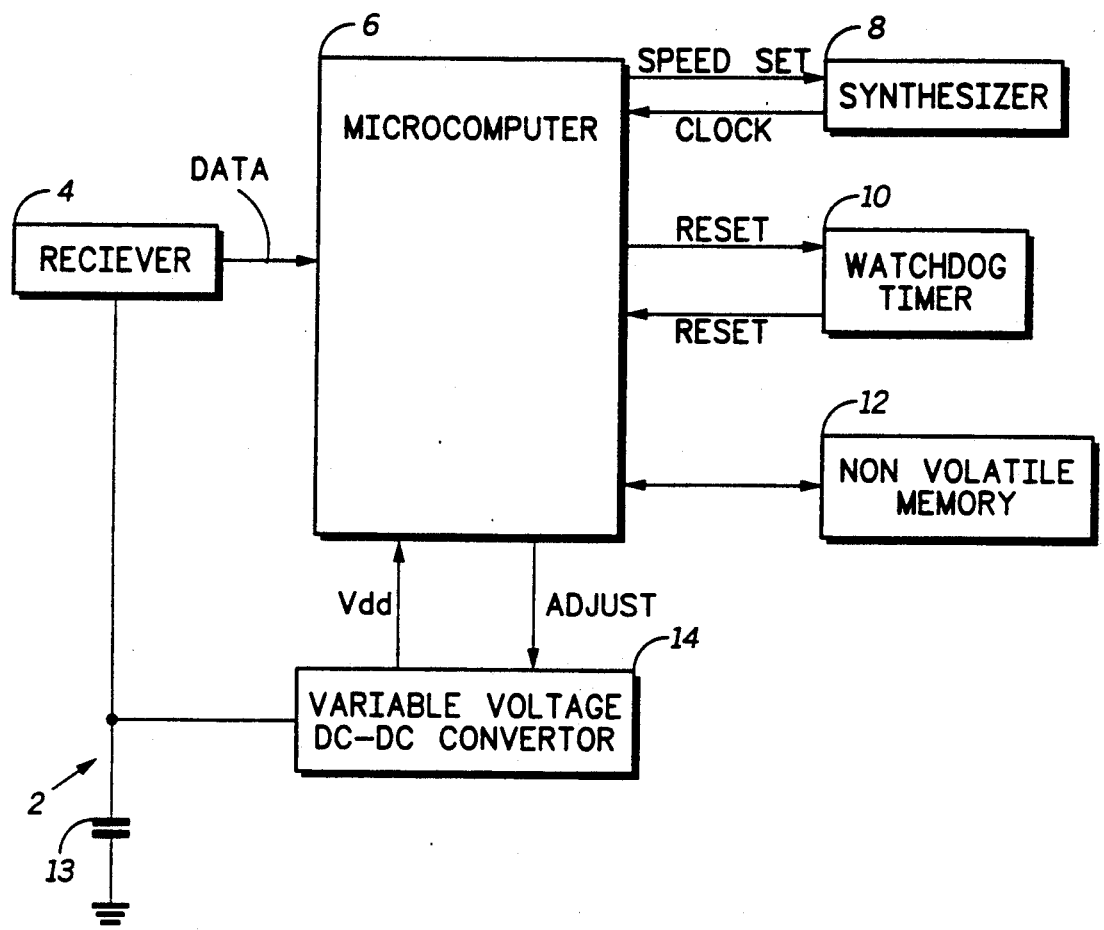
FIG. 1 shows in block diagrammatic form a paging receiver.

Referring firstly to FIG. 1, a paging receiver 2 includes a receiver section 4 for receiving and demodulating radio frequency (RF) data under the control of a microcomputer 6. The microcomputer 6 includes a synthesizer 8 and a watchdog timer 10 and associated non-volatile memory (NVM) 12. A microcomputer IC including a watchdog timer and synthesizer is the Motorola MC146805H2 microcomputer which is used in the preferred embodiment. The receiver 4 is powered from a battery 13 and the microcomputer 6 and associated Functions 8, 10 and 12 are powered from battery 13 via a variable voltage DC-DC converter 14 under the control of the microcomputer.

The microcomputer 6 is able to operate at a number of different predetermined bus speeds in order to optimize the battery life with respect to the data rate received by the receiver and processed by the microcomputer. It should be appreciated that a microcomputer processing a signal having a 1200 baud data rate requires a higher bus speed than if it were processing a signal having a 300 baud data rate. Furthermore, during intervals when receiver 4 is inactive, the microcomputer may operate at a substantially reduced bus speed since no signal is being received. However, activities such as the reading of a message by the user, or generating an alert signal, may require a some what higher bus speed. Thus the microcomputer may operate at a plurality of bus speeds depending upon the function being performed by the microcomputer.

Figure 2:
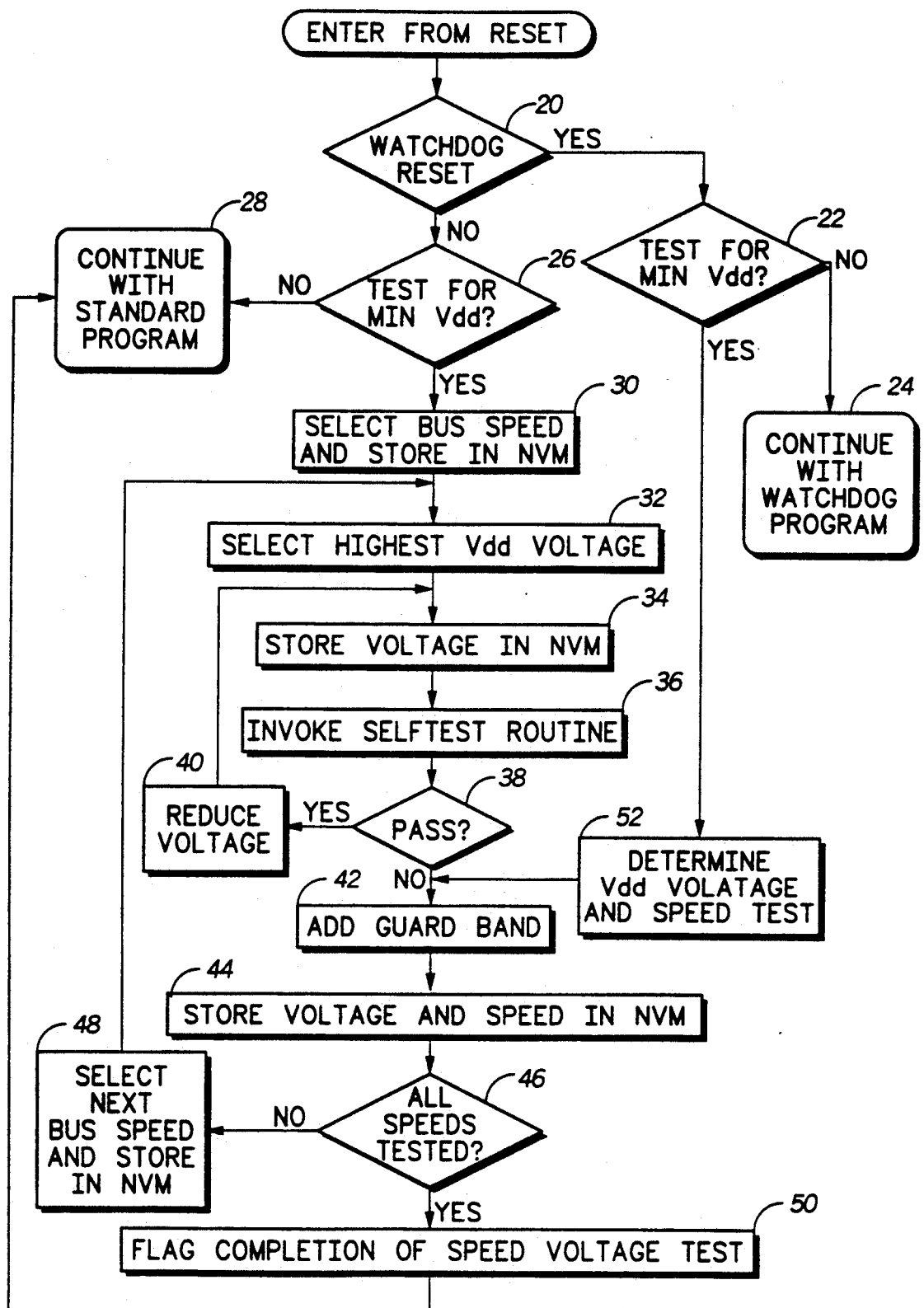
FIG. 2 shows a flow chart illustrating the operation of the receiver in an initial test mode.

In order to allow the microcomputer to draw as little operating current as possible, and so conserve battery life, the voltage which is demanded from the DC-DC converter during normal operation of the receiver is determined in the following way. Upon initialization of the microcomputer, e.g. following reset or power-on, the microcomputer follows the test sequence shown in FIG. 2.

For reasons which will become apparent later, the microcomputer first checks whether the reset was caused by the watchdog timer timing out, step 20. If the watchdog timer caused the reset, the microcomputer tests whether the test sequence for determining the minimum operating voltage was in progress, step 22, and if not continues with the prior art watchdog program, step 24. If the first check as to whether the watchdog timer caused the reset is negative, step 20, the microcomputer tests whether the test sequence for determining the minimum operating voltage should be entered by testing a flag in NVM 12, step 26: if not the microcomputer continues with the standard operating program, step 28. A description of a program operating within a pager is included within U.S. Pat. No. 4,755,816 to DeLuca which is hereby incorporated by reference. If the test sequence for determining the minimum operating voltage is to be entered, the microcomputer enters the minimum operating voltage determining sequence as follows.

The microcomputer selects a first bus speed to be tested and stores this speed in NVM 12, step 30. The microcomputer then selects the highest voltage from the DC-DC converter 14 and stores this voltage in NVM 12, step 32 and 34. The microcomputer then invokes a self-test routine where the proper operation of elements drawing power from $V_{dd}$ are tested, step 36. If the self-test routine is successful, step 38, the operating voltage of the system is reduced by a predetermined amount, step 40, the new operating voltage is stored in NVM 12 and the self-test routine is again invoked. This sequence of reducing the operating voltage and invoking the self-test routine is repeated until the self-test routine fails. If the self-test routine fails, a small "guard band" value is then added to the value of the operating voltage, step 42, and the resulting voltage together with the current bus speed is stored in NVM 12, step 44, for future use in normal operation of the pager as will be described later. The microcomputer then checks whether all the bus speeds of the pager have been tested, step 46, and if not selects the next bus speed to be tested, stores it in NVM 12, step 48, and repeats the test sequence beginning with the highest voltage from the DC-DC converter 14 until the self-test routine fails.

In this way a minimum operating voltage is determined for each bus speed of the system and stored in NVM 12. When the microcomputer determines that all of the bus speeds have been tested, step 46, it flags completion of the speed/voltage test and stores the flag in the NVM 12, step 50, in order to allow the microcomputer to check whether the speed/voltage test needs to be repeated when the microcomputer subsequently enters the test sequence following a power-on or reset as described above.

It is possible that as the operating voltage is reduced in order to determine the operating voltage at which receiver first operates unsatisfactorily, operation may not be sufficiently predictable for the self-test routine to be completed: in this case the microcomputer may operate out of control until reset by the system watchdog timer 10. In this case, when the test routine is entered from reset the first check of the microcomputer as described above to determine whether the watchdog timer caused the reset is positive, step 20, as is the subsequent check as to whether the test sequence for determining the minimum operating voltage was in progress, step 22. The microcomputer interprets such an outcome as a failure of the self-test routine and so determines the operating voltage and bus speed most recently used, step 52, and enters the test sequence loop at the point as if the self-test routine had failed.

It will be appreciated that the self-test routine can test not only the microcomputer 6, but also all circuits operating from the $V_{dd}$ line, thus providing a thorough test of normal operation of the paging receiver. Such as a codeplug, NVM 12, having a predetermined address for the paging receiver.

Figure 3:
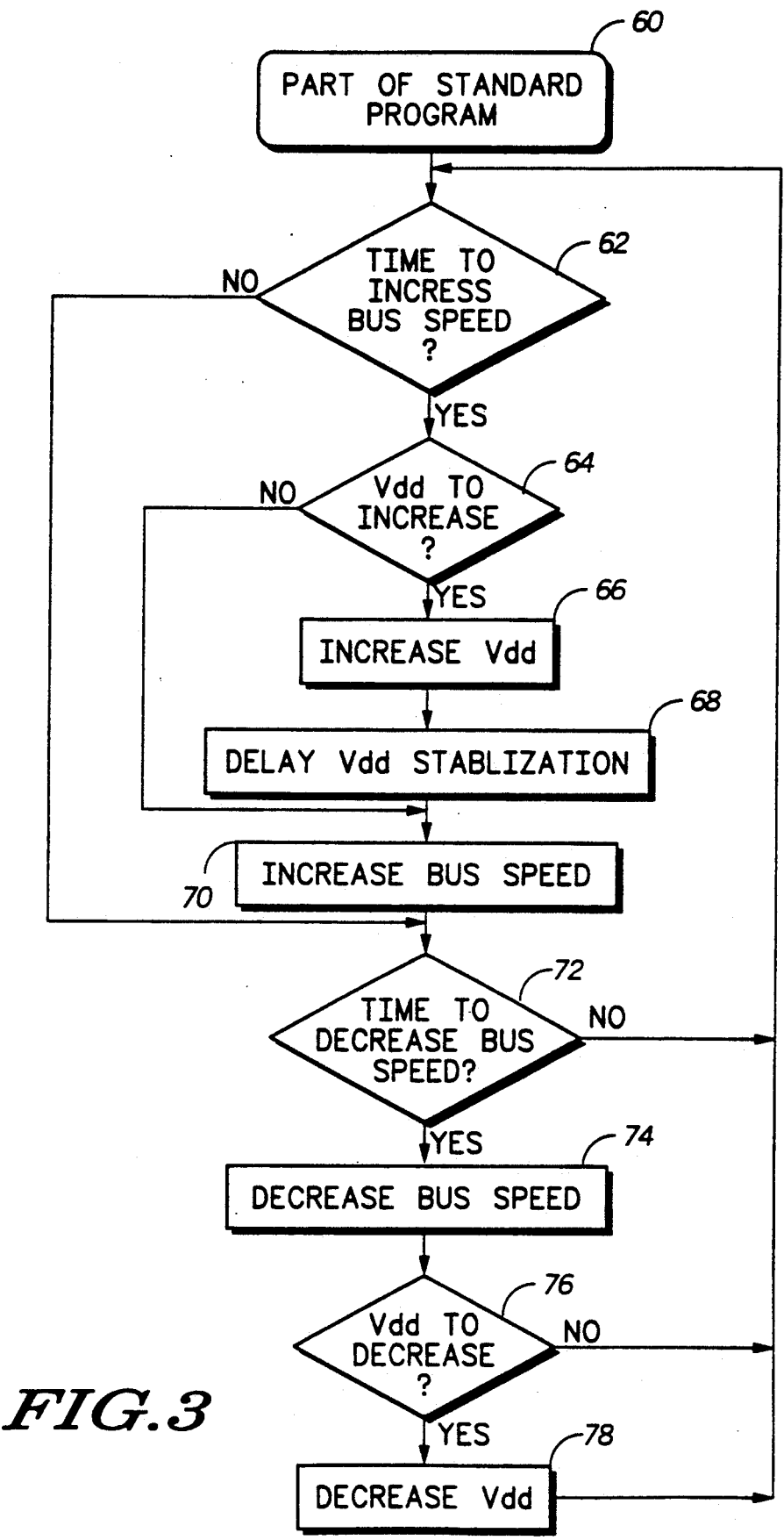
FIG. 3 shows a flow chart illustrating part of the normal operation of the receiver.

Referring now to FIG. 3, in subsequent normal use of the pager, as part of the standard operating program, step 60, the microcomputer invokes the following loop sequence. The microcomputer first checks whether the bus speed is to be increased, step 62. If the bus speed is to be increased, the microcomputer checks whether the operating voltage is to be increased by comparing the current operating voltage with the operating voltage stored in the NVM 12 and associated with the new bus speed, step 64. If the operating voltage is to be increased, the microcomputer increases the operating voltage to that stored in the NVM 12 and associated with the new bus speed, step 66, and then delays for a short time to allow the system to stabilize at the increased operating $V_{dd}$, 68, the bus speed is then increased, step 68. If the check as to whether the bus speed is to be increased is positive, in step 62, but the check as to whether the operating voltage is to be increased is negative, in step 64, the bus speed is increased directly, step 70, without increasing the operating voltage or waiting for stabilization.

The microcomputer then checks whether the bus speed is to be decreased, step 72. If the bus speed is not to be decreased, the microcomputer returns to the start of the loop sequence. If the bus speed is to be decreased, the microcomputer decreases the bus speed, step 74, and then checks whether the operating voltage is to be decreased by comparing the current operating voltage with the operating voltage stored in the NVM 12 and associated with the new bus speed, step 76. If the operating voltage is not to be decreased, the microcomputer returns to the start of the loop sequence. If the operating voltage is to be decreased, the microcomputer decreases the operating voltage to that stored in the NVM 12 and associated with the new bus speed, step 78 and then returns to the start of the loop sequence.

It will thus be appreciated that the receiver can determine, independently of all other receivers in the system, its own minimum operating voltage for each bus speed at which it can operate and thus minimize the energy drawn from its battery for each bus speed and so maximize its battery life.

It will be appreciated that although the invention has been described above with reference to a paging receiver, the invention is applicable generally to any computing system in which the minimum operating voltage may vary from one system to another and in which there is a desire to minimize power consumption, for example other microcomputer based portable equipment such as two-way radios, remote control transmitters, toys, personal computers, etc.

It will be appreciated that the invention has been described above by way of example only and that modifications to the above example may be made without departing from the spirit and scope of the invention.

What is claimed is:

1. A computing system operable at a plurality of bus speeds, each bus speed having a corresponding minimum operating voltage, comprising:
   voltage producing means for selectively producing one of a plurality of voltages for operating the computing system; and
   means coupled to the voltage producing means for selecting one of the plurality of voltages which is no less than the minimum operating voltage at the bus speed at which the computing system is operating.

2. The computing system of claim 1 wherein the means for selecting comprises means for determining the predetermined minimum operating voltage of the computing system by operating the computing system at a plurality of different operating voltages until the computing system operates unsatisfactorily and for selecting an operating voltage greater than the minimum operating voltage.

3. The computing system of claim 2 wherein the predetermined minimum operating voltage is determined during an initial test mode of the computing system.

4. The computing system of claim 1 wherein the computing system is operable at a plurality of bus speeds, each bus speed having a corresponding predetermined minimum operating voltage, wherein the means for selecting selects the voltage output of the voltage producing means which is no less than the predetermined minimum operating voltage at the bus speed at which the computing system is operating.

5. The computing system of claim 1 wherein the predetermined minimum operating voltage corresponding to each bus speed is determined during an initial test mode of the computing system.

6. The computing system of claim 1 wherein the computing system comprises a paging receiver and decodes received paging signals.

7. A method of operating a computing system operable at a plurality of bus speeds, each bus speed having a corresponding minimum operating voltage comprising the steps of:
   determining the minimum operating voltage for each bus speed of the system; and
   selecting an operating voltage of the system which is no less than the minimum operating voltage of the bus speed at which the computing system is operating.

8. The method of claim 7 wherein the step of determining the predetermined minimum operating voltage of the system comprises operating the computing system at a plurality of different operating voltages until the computing system operates unsatisfactorily and the step of selecting the operating voltage of the system comprises selecting an operating voltage greater than the minimum operating voltage.

9. The method of claim 7 comprised in an initial test mode of the computing system.

10. The method of claim 7 of operating a computing system operable at a plurality of bus speeds, each bus speed having a corresponding predetermined minimum operating voltage, the method further comprising the steps of:
    determining the predetermined minimum operating voltage for each bus speed of the system; and
    selecting an operating voltage of the system which is no less than the predetermined minimum operating voltage of the bus speed at which the computing system is operating.

11. The method of claim 7 further comprising the steps of:
    operating the computing system at a first bus speed and a first voltage no less than the corresponding minimum operating voltage of the first bus speed; and
    operating the computing system at a second bus speed and a second voltage no less than the corresponding minimum operating voltage of the second bus speed.

* * * * *